A. C. TAYLOR.
Cultivator.

No. 120,794.  Patented Nov. 7, 1871.

Inventor:
A. C. Taylor.
per Burridge & Co
Atty's

Witnesses,

UNITED STATES PATENT OFFICE.

ALEXANDER C. TAYLOR, OF NORTH FAIRFIELD, OHIO.

IMPROVEMENT IN CULTIVATORS.

Specification forming part of Letters Patent No. 120,794, dated November 7, 1871.

*To all whom it may concern:*

Be it known that I, ALEXANDER C. TAYLOR, of North Fairfield, in the county of Huron and State of Ohio, have invented a new and Improved Cultivator, of which the following is a description, reference being had to the accompanying drawing making part of this specification.

Figure 1:
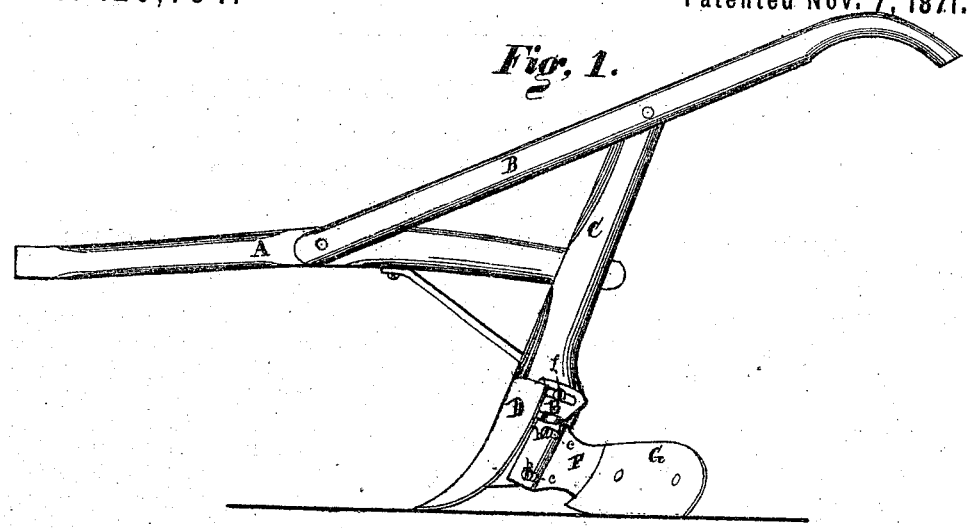
Figure 2:
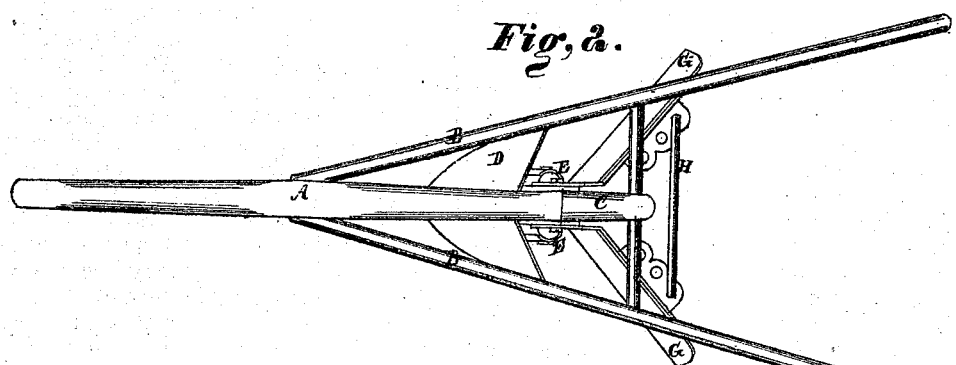
Figure 3:
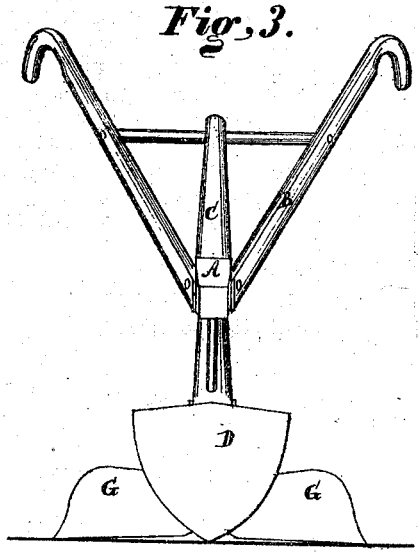
Figure 4:
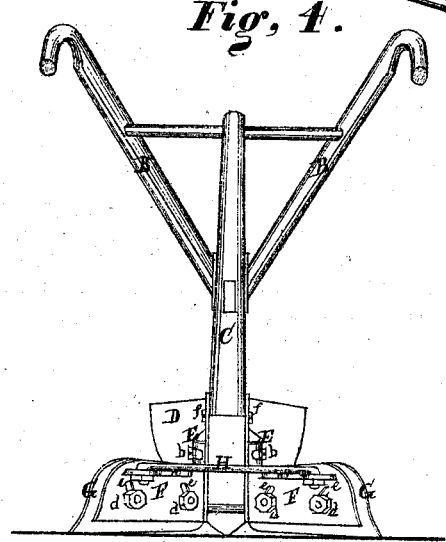

Figure 1 is a side view of the cultivator. Fig. 2 is a top view. Fig. 3 is a view of the front end. Fig. 4 is a view of the rear end.

Like letters of reference refer to like parts in the different views.

The object sought for and obtained in this invention is the construction of a cultivator so that the wings constituting the mold-boards of the implement can be expanded or contracted in width more or less, as circumstances may require. The invention also provides for the vertical adjustment of the blades and for their being reversible, so that the upper unworn edge can be substituted for the lower worn one in the manner as hereinafter more fully set forth.

In Fig. 1, A represents the beam of the implement, to which the handles B are attached, also the standard C. To the lower end of the standard is secured a share, D, in the rear of which, on each side of the standard, is attached a stay, E, in the upper end of which is a slot for the admission of the screw $f$, whereby it is connected to the standard. The lower part or stem of the stay is half round in shape, and to which the wings F, Fig. 4, are attached by means of set-screws $b$ inserted in slots $c$ made therein for their admission and for the adjustment of the wings, as hereinafter shown. To the outside of each of said wings is attached a blade, G, by means of the screws $b$ inserted in slots $e$ made for their admission, as shown in Fig. 4.

The special purpose of the above-described cultivator is for the cultivation of corn or other plants when set in rows or hills. To adapt the implement to the width of the rows so that it shall run therein without disturbing the plants, the screws in the slots $c$ being loosened will allow the wings to be spread apart more or less, as may be required, and which, when so spread, are retained in position by means of the brace H, Fig. 2. The stems of the stays E being rounded allow the wings to turn thereon easily and readily, and which at the same time hold them from moving in a vertical direction. The wings, however, may be adjusted in their reference to height by loosening the set-screws $f$ and $b$, Fig. 1, which will allow the wings to be raised or lowered so as to cause the blades to run more or less deeply in the ground, and thereby stir the soil deep or shallow, as may be required. So, also, may the blades G be adjusted in their connection with the wings, which, as fast as they may become worn away, can be let down by loosening the set-screws $b$, and which, when the lower side is worn out, they can be taken off and put on again in reverse order, so as to make the upper unworn edge do the duty of the lower one, worn too much for further good service.

What I claim as my improvement, and desire to secure by Letters Patent, is—

The arrangement, upon the standard C, of the share D, hinged and adjustable wings F, adjustable and reversible wings G, and stay-rod H, as and for the purpose set forth.

ALEXANDER C. TAYLOR.

Witnesses:
DWIGHT KELLOGG,
FRANKLIN SMITH.

(43)